United States Patent
Kuo et al.

(10) Patent No.: US 7,206,265 B2
(45) Date of Patent: Apr. 17, 2007

(54) DEVICE CAPABLE OF DETECTING VIBRATION/SHOCK

(75) Inventors: Pei-Ching Kuo, Taipei (TW); Cheng-Yao Liao, Taipei (TW)

(73) Assignee: Lite-On It Corporation, Neihu, Taipei (TW)

( * ) Notice: Subject to any disclaimer, the term of this patent is extended or adjusted under 35 U.S.C. 154(b) by 421 days.

(21) Appl. No.: 10/711,180

(22) Filed: Aug. 31, 2004

(65) Prior Publication Data

US 2005/0083801 A1  Apr. 21, 2005

(30) Foreign Application Priority Data

Sep. 4, 2003  (TW) .............................. 92124522 A

(51) Int. Cl.
*G11B 7/00* (2006.01)

(52) U.S. Cl. .............................. 369/44.32; 369/44.12; 369/112.01

(58) Field of Classification Search ..................... None
See application file for complete search history.

(56) References Cited

U.S. PATENT DOCUMENTS

| 5,923,487 A * | 7/1999 | Carlson et al. ................ 360/60 |
| 6,246,638 B1 * | 6/2001 | Zook et al. .................. 367/140 |
| 2003/0067703 A1 * | 4/2003 | Holmes et al. ................ 360/69 |

* cited by examiner

*Primary Examiner*—Muhammad Edun
(74) *Attorney, Agent, or Firm*—Winston Hsu

(57) ABSTRACT

A device capable of detecting vibration/shock includes a laser diode capable of transmitting a laser beam and a vibration/shock detector capable of detecting vibration or shock, wherein the laser diode and the vibration/shock detector are formed on one chip.

5 Claims, 3 Drawing Sheets

DEVICE CAPABLE OF DETECTING VIBRATION/SHOCK

BACKGROUND OF INVENTION

1. Field of the Invention

The present invention relates to a device capable of detecting vibration/shock, and more particularly, to a device capable of detecting vibration/shock integrated with a laser diode or a photo detector chip within a pick-up head.

2. Description of the Prior Art

Generally speaking, a vibration or shock usually causes an optical disk drive to read data from a disk in error or to write data to a disk in error, and sometimes results in break down of the pick-up head of the optical disk drive and/or damage to the disk.

For protecting the optical disk drive and the disk from being damaged by vibration or shock, there must be some mechanism for detecting any significant vibration and shock in the disk drive. In an optical disk drive, the tracking error signal may be utilized to detect vibration and shock; when an optical disk drive suffers from vibration or shock, the steady state error of the tracking error signal increases. Due to this phenomenon, the tracking error signal can be utilized to determine the magnitude of the vibration/shock suffered by the optical disk drive. Correspondingly, the disk drive initiates a reduction in rotational speed or even shuts down when significant vibration/shock is detected to prevent the further damage.

However, the conventional method of determining the magnitude of vibration/shock by monitoring the tracking error signal is not instantaneous. That is, when the vibration/shock is detected, usually the damage has already occurred, which means any errors in reading or writing data have been made already.

Moreover, sometimes the vibration/shock is not reflected by the tracking error signal, or the tracking error signal does not result from vibration/shock suffered by the optical disk drive. Therefore, it is a drawback of the conventional method of determining the magnitude of vibration/shock by utilizing the tracking error signal that erroneous determination is possible, hence the efficiency and accuracy of reading and writing of the optical disk drive is reduced.

SUMMARY OF INVENTION

It is therefore a primary objective of the claimed invention to provide a device capable of detecting vibration/shock.

Briefly described, the claimed invention discloses a first device capable of detecting vibration/shock. The device includes a laser diode capable of transmitting a laser beam and a vibration/shock detector capable of detecting vibration or shock, wherein the laser diode and the vibration/shock detector are formed on one chip.

The claimed invention further discloses a second device capable of detecting vibration and shock. The device includes a photo detector for receiving a reflected laser beam and a vibration/shock detector capable of detecting vibration or shock, wherein the photo detector and the vibration/shock detector are formed on one chip.

The claimed invention further discloses a pick-up head capable of detecting vibration and shock. The pick-up head includes a chip and a vibration/shock detector formed on the chip, capable of detecting vibration or shock received by an optical disk drive.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
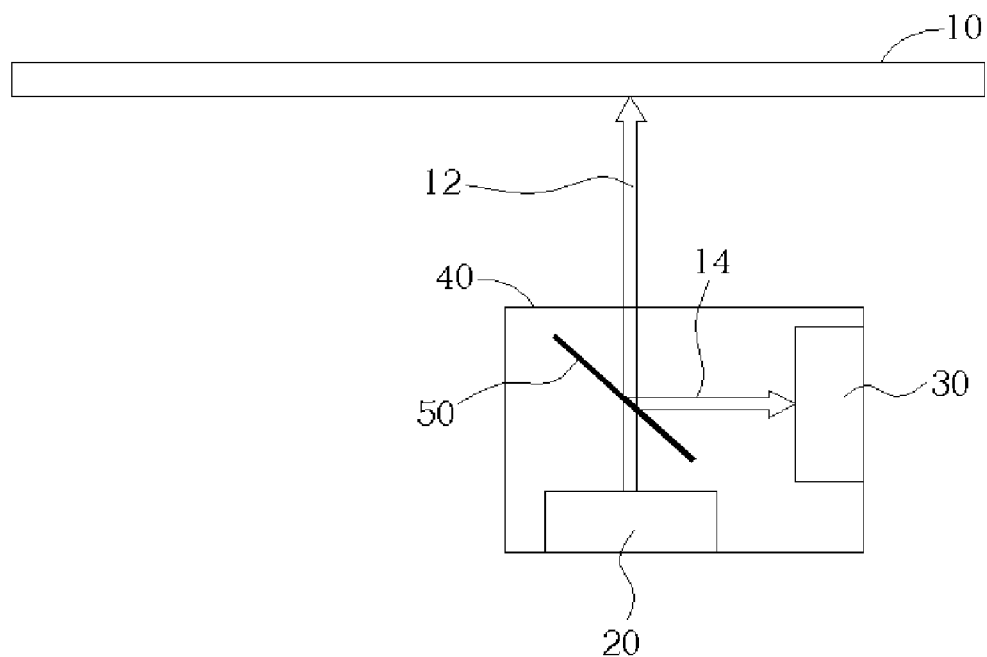
FIG. 1 is a diagram of the relative location between a pick-up head and a disk.

Please refer to FIG. 1. FIG. 1 is a diagram of the relative location between a pick-up head 40 and a disk 10. Generally, the pick-up head 40 comprises a laser diode 20, a beam splitter 50, and a photo detector 30. The laser diode 20 transmits a laser beam 12, which is focused on the disk 10 through the beam splitter 50. Further, the laser beam 14 is reflected from the disk 10 and is directed by the beam splitter 50 onto the photo detector 30.

Figure 2:
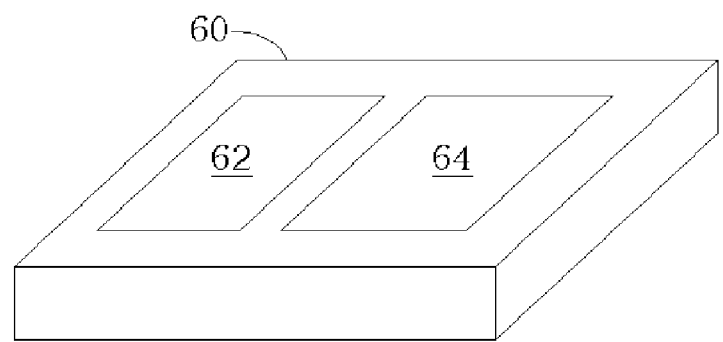
FIG. 2 is a perspective diagram of a first embodiment of the present invention pick-up head capable of detecting vibration and shock.
Figure 3:
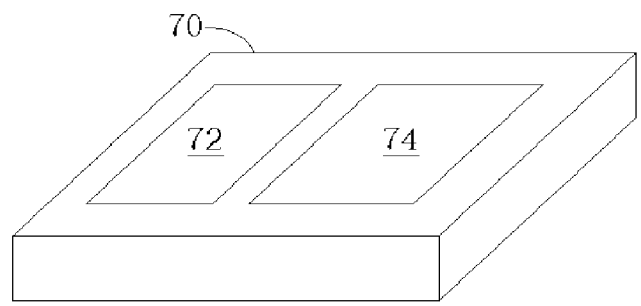
FIG. 3 is a perspective diagram of a second embodiment of the present invention pick-up head capable of detecting vibration and shock.

Please refer to FIG. 2 and FIG. 3. FIG. 2 and FIG. 3 are two perspective diagrams of the present invention pick-up head capable of detecting vibration and shock. As illustrated in FIG. 2, a vibration/shock detector 64 is integrally formed on a chip 70 of a photo detector 62. In general, the vibration/shock detector 64 may be a piezoelectric detector, a piezo-resistant detector, or a capacitance detector. These categories of vibration/shock detector are capable of determining the received magnitude of vibration/shock according to stress changes, displacement, or acceleration. The processes of these vibration/shock detectors and common ICs are compatible, which means the vibration/shock detectors may be manufactured by facilities capable of manufacturing common ICs. Therefore, it is achievable for the process that fabricates the photo detector 62 to form the vibration/shock detector 64 on the same chip 60.

FIG. 3 is a perspective diagram of a vibration/shock detector 74 integrally formed on a chip 70 of a laser diode 72. Similarly, since the manufacturing process required to form the vibration/shock detector 74 is compatible to the process required to form the laser diode 72, the vibration/shock detector 74 can be integrally formed on the chip of the laser diode 72. This results a device integrating the vibration/shock detector 74 and the laser diode 72 as illustrated in FIG. 3.

Furthermore, since a vibration/shock detector is included in the claimed pick-up head, the claimed pick-up head is capable of replacing conventional mechanisms for determining vibration/shock in optical disk drives according to the tracking signal error. Moreover, the probability of erroneous determination in the case of the claimed vibration/shock detector is less than that of conventional detecting method.

Figure 4:
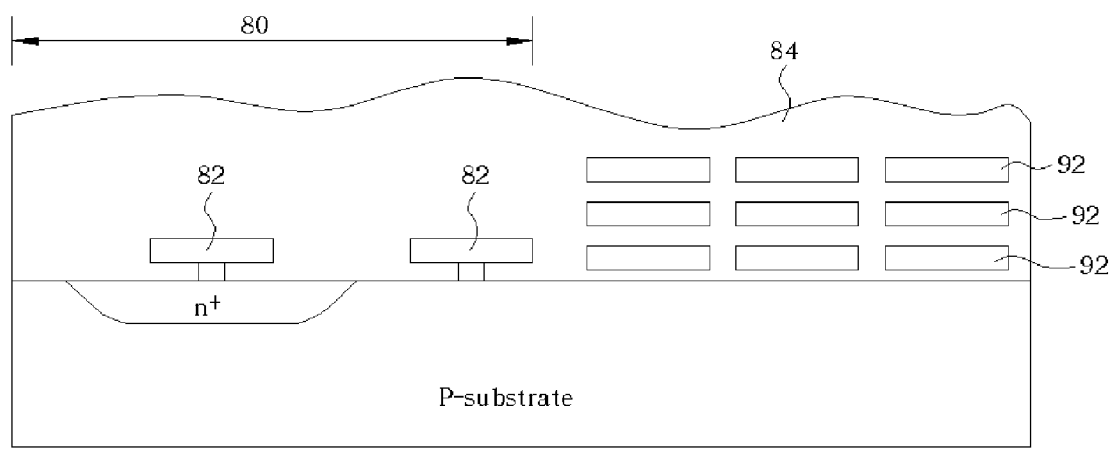
FIG. 4 is a diagram of a first step of implementing the present invention chip comprising the photo detector and the vibration/shock detector.
Figure 5:
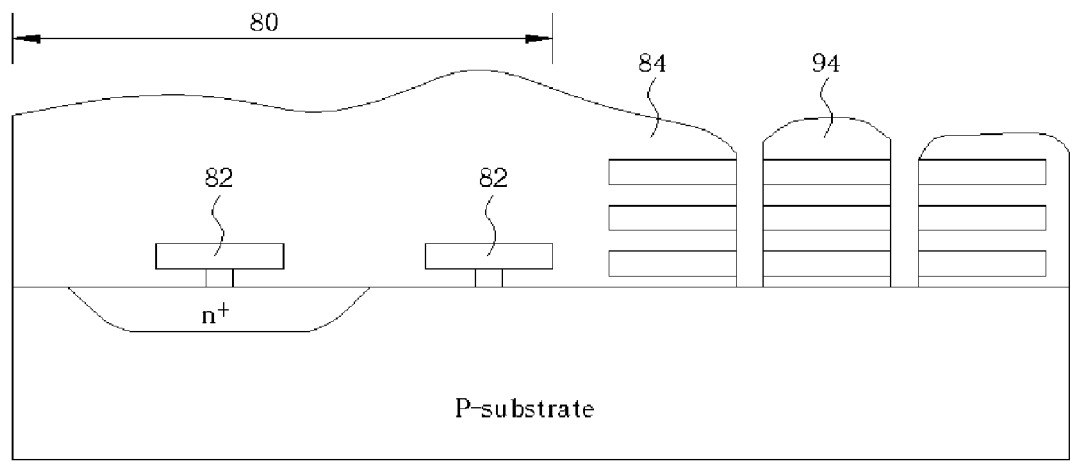
FIG. 5 is a diagram of a second step of implementing the present invention chip comprising the photo detector and the vibration/shock detector.
Figure 6:
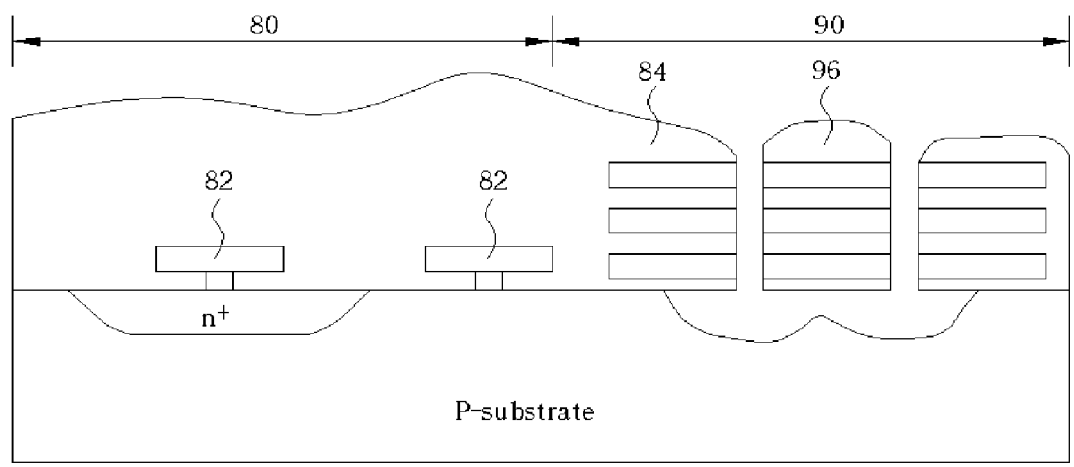
FIG. 6 is a diagram of the present invention chip comprising the photo detector and the vibration/shock detector.

Please refer to FIG. 4, FIG. 5, and FIG. 6. These are diagrams of three steps of implementing the claimed chip comprising the photo detector and the vibration/shock detector. As illustrated in FIG. 4, a high density N-type area is formed on the P substrate by ion implantation. The metal 82 contacts the P substrate and the high density N-type area, and forms a PN-type photo detector 80. Furthermore, in the process of forming the photo detector 80, when forming the dielectric layer 84, the manufacturing process is capable of forming a stacked metal 92 in the dielectric layer.

After, a comb-fingers electrode 94 is formed by deep-reaction ion etching on the dielectric layer as illustrated in FIG. 5. Finally, as illustrated in FIG. 6, an isotropic etching is performed on the substrate of the chip, and a floating comb-fingers electrode 96 is then formed. Accordingly, a vibration/shock detector is then realized. Therefore, the photo detector 80 and the vibration/shock detector 90 are integrated on the same chip successfully as illustrated in FIG. 6.

In summary, the present invention introduces a device capable of detecting vibration and shock. The present invention integrates a vibration/shock detector and a laser diode or a photo detector into a single chip and locates the chip on the pick-up head, so that the pick-up head is equipped with a device capable of detecting vibration and shock. Therefore, the optical disk drive can detect vibration and/or shock immediately, and the slow response and erroneous determination symptomatic of detection via the tracking error signal are improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device capable of detecting vibration and shock, the device comprising:
   a laser diode capable of transmitting a laser beam; and
   a vibration/shock detector capable of detecting vibration or shock;
   wherein the laser diode and the vibration/shock detector are formed on one chip.

2. The device of claim 1 wherein the vibration/shock detector comprises floating comb-finger electrodes.

3. A device capable of detecting vibration and shock, the device comprising:
   a photo detector for receiving a reflected laser beam; and
   a vibration/shock detector capable of detecting vibration or shock;
   wherein the photo detector and the vibration/shock detector are formed on one chip.

4. The device of claim 3 wherein the vibration/shock detector comprises floating comb-fingers electrodes.

5. A pick-up head capable of detecting vibration and shock, the pick-up head comprising:
   a chip; and
   a vibration/shock detector formed on the chip, capable of detecting vibration or shock received by an optical disk drive;
   wherein the vibration/shock detector comprises floating comb-finger electrodes.

* * * * *